UNITED STATES PATENT OFFICE.

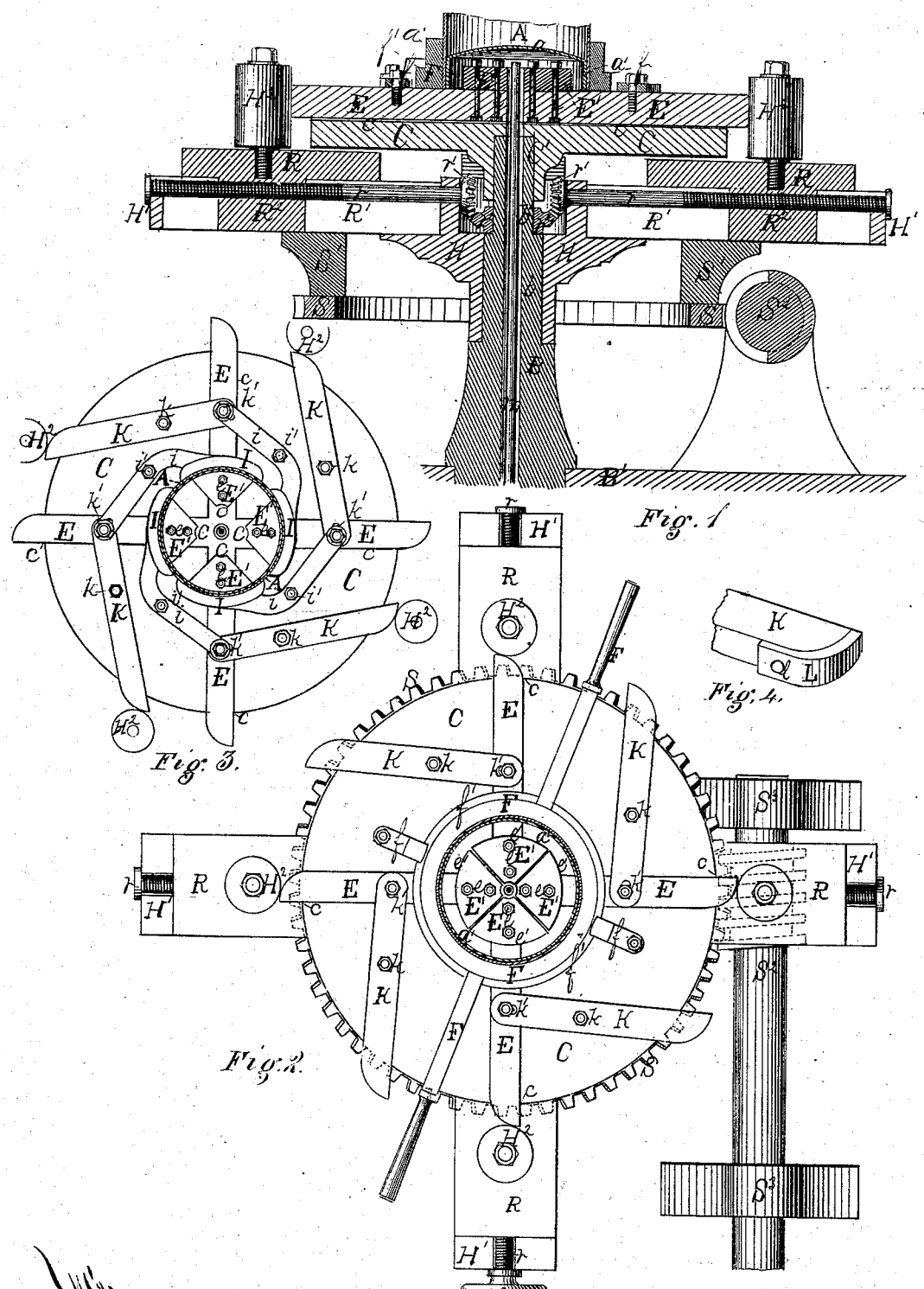

ROBERT A. CARTER, OF PITTSBURG, ASSIGNOR TO HIMSELF AND HUGH McDONALD, OF ALLEGHENY CITY, PENNSYLVANIA.

MACHINE FOR WELDING CYLINDER-HEADS.

SPECIFICATION forming part of Letters Patent No. 239,725, dated April 5, 1881.

Application filed December 13, 1880. (No model.)

*To all whom it may concern:*

Be it known that I, ROBERT A. CARTER, of Pittsburg, county of Allegheny, State of Pennsylvania, have invented or discovered a new and useful Improvement in Machines for Welding Cylinder-Heads; and I do hereby declare the following to be a full, clear, concise, and exact description thereof, reference being had to the accompanying drawings, making a part of this specification, in which—like letters indicating like parts—

Figure 1 is a vertical sectional view of my improved machine. Fig. 2 shows a top-plan view of the same. Fig. 3 is a similar view of the central part of the apparatus, illustrative of certain modifications in construction hereinafter described; and Fig. 4 is a view, to an enlarged scale, of the end of one of the operating-levers, also illustrative of a modification in construction.

My invention relates to a machine for welding the heads in cylinders.

Cylinders of the class referred to are used largely in car-brake apparatus and as water-reservoirs for domestic uses. A part of such a cylinder is shown at A, Fig. 1, and the form of head usually employed at $a$. This head is formed of a concavo-convex or a plane disk, $a$, and a rim or flange, $a'$, which fits within the ends of the cylinder, the flange turning outward, and the flange and cylinder are united by riveting or welding—preferably welding—so as to give a solid and tight union. This welding has heretofore been done by hand; but such method is expensive and does not insure at all times as perfect a result or product as is desirable, especially for brake purposes. My invention is expressly designed to do this class of work, though it may also be used for other or kindred purposes.

In the drawings, B represents a standard or post, which is by preference made hollow, as shown, and is firmly fixed or secured in any suitable foundation, B'. On the upper end of this post is secured a circular table, C, by socket C', or by other suitable means, so as to be fixed or stationary in place. In the upper face of this table are made radial grooves $c$, in which are arranged arms or bars E, which extend from points near the center outward a little beyond the periphery of the table. On the inner end of each of these bars is secured, by bolts $e$ or otherwise, a compressing or hammer die, E'. These dies are given a segmental form, as shown, so that they may fit compactly and allow the requisite size and motion within a limited space. The outer curved edges or working-faces, $e'$, of the dies are formed of the same curve as the interior $a'$ of the part to be welded, against which part these dies press when moved outward away from their common center. The means employed for operating these dies will presently be described.

A band or tire, F, is also secured on the face of the table around or inclosing the dies. This may be done by means of swinging dogs or blocks $f$, the ends of which fit or lap onto the annular shoulder $f'$. The interior diameter of this band or tire is such as to receive the end of the cylinder A and prevent distortion or material enlargement of such end when the welding is done. It thus serves both as a mold to preserve the form of the cylinder and as a barrier or anvil against or by which the pressure of the dies is supported. And since this pressure is outward in opposite directions, the tire, if allowed a slight range of lateral movement, will adjust itself to or be shifted by the dies to a common center therewith, so that the pressure of the several dies will be equal. This range of adjustment can readily be provided and still preserve sufficient bearing of the blocks $f$ on the shoulder $f'$ to prevent the tire from being raised from the table during the welding operation. When it is desired to remove the tire the blocks $f$ may be turned to one side. Other suitable means may be employed, however, for securing the tire on the table.

It will be observed that the extent of the working-faces $e'$ of the dies is less than the inner circumference of the flange or part $a'$. In order to secure the action of the dies upon all parts of this circumference and weld the flange and rim of the cylinder entirely around, I provide for turning or partially rotating the tire and cylinder by means of handles F', which extend outward in convenient position for the workmen. After the dies have once acted on the flange $a'$, the cylinder will fit within the band or tire with sufficient tightness to cause it to turn with the band, and thereby be moved to proper position for all parts to be operated on in succession by the dies. As shown in Fig. 1, these dies are raised above the surface of the table, and in operation they are covered by or move within the recess in the end of the cylinder formed by the sunken head $a$.

The dies E' and sliding bars E are operated as follows: A hub, H, incloses and rotates around the part $b$ of the post. This hub carries four radial arms, H', which extend outward beyond the periphery of the table C. On each of these arms is carried a loose roller, $H^2$, all four being arranged at equal distances from the center of rotation, such distances being adjusted with relation to the bars E, so that as the rollers pass they shall bear against the rounded extremities of the bars and push them away from contact with flange $a'$ toward their common center. In order to press the dies outward against the flange $a'$, or the part to be operated on, levers K are employed, which are pivoted on the face of the table, as at $k$, and their inner ends are connected by short slots and bolts $k'$ with the respective bars E. These levers K are arranged at, or nearly at, right angles to the line of their respective bars E, and their outer ends extend beyond the periphery of the table sufficiently far for the rollers $H^2$ to bear thereon as they pass, and by movement thus given to move the dies outward the desired distance, so as to effect the desired compression of the parts to be welded between these dies and the tire F. The extent of this movement may be regulated in various ways, as by moving the pivot-points $k$ toward or from the connections $k'$, or by lengthening and shortening the bars and levers E and K, as illustrated in Fig. 4, by means of a movable shoe, L, which may be turned on its pivot-bolt $l$ over the end of the bar or lever, so as to increase its length by the thickness of the shoe, or, when desired, it may be turned up or down out of the way; or, on the other hand, the rollers $H^2$ may be made adjustable toward and from the periphery of the table; and to this end I mount each roller in a sliding block, R, Figs. 1 and 2, which is fitted to move in a slot, R', cut vertically in or through the respective arm H'. Screw-shafts $r$ work through the tapped lugs $R^2$, and serve to move the blocks and rollers back and forth. To secure movement in unison bevel-gear wheels $r'$ are secured on the inner ends of the respective shafts $r$, which gear with a connecting-wheel, $r^2$, journaled loose on the part $b'$ of the post. A hand-wheel, $R^3$, on the outer end of one of the screws affords convenient means for operating them.

When the machine is designed to operate upon articles varying considerably in size or thickness, I prefer the method last described for adjusting the rollers, and thereby adapting the movements of the dies to the requirements of each case; but when little change is required it may be made by either of the other means described.

Rotary motion is given to the arms H', so as to carry the rollers $H^2$ around the table by means of a gear-wheel, S, which is supported below by means of pendent brackets S', Fig. 1. A worm-shaft, $S^2$, mounted in suitable bearings, $S^3$, or other equivalent gear-wheel, may be employed to drive the wheel S.

Instead of the solid tire or band F for holding the cylinder against the action of the dies E', outside dies may be substituted which shall operate simultaneously with and opposite the dies E'. This modification in construction is illustrated in Fig. 3, in which I are concave-faced dies, adapted in form to the outer surface of the cylinder A, and these outer dies are operated by bent levers $i$, which are pivoted, as at $i'$, to the table, and connected, as at $k'$, to the bars E. As thus arranged, the outward movement of the bars E will move the outer dies, I, against the outer surface of the cylinder simultaneously with the outward movement of the inner dies, E', against the inner surface of the cylinder, thereby imparting a positive compressing action on both sides to secure the desired welding.

In order to assist in maintaining a welding-heat on the parts to be welded, a gas-pipe, $m$, may be passed up through the hollow post, which may terminate in a jet or jets at its upper end, where the gas may be burned. Also, oil may be poured onto the table within the tire F, or between the dies E I, Fig. 3, which, being ignited by the hot iron, will assist in maintaining the desired heat.

I am aware that it is not new with me to operate dies carried on the inner ends of radial sliding bars by means of rubbers or rollers which rotate around the table on which the bars and dies are mounted, such construction being shown and described in United States Patent granted to Henry Carter, March 2, 1858, No. 19,485; but the apparatus there shown was designed for making bolts, and the dies operated inward against the inclosed bolt instead of outward against a circular inclosing-surface.

Instead of using four inner dies, E', as described, one or more may be used to press a greater or less portion of the inner surface of the part to be welded, and, so far as I am aware, it is new with me to combine such inner movable dies with an exterior band for holding the end of the cylinder against the expansive force of the inner dies, whereby the head-flange may be welded to the rim of a cylinder, as I have herein described.

In so far as the outer dies, I, are adapted for use as herein described, they will form the subject-matter of a separate application.

I claim herein as my invention—

1. In a machine for welding heads in cylinders, one or more inner dies, E', arranged to move outward and operate against the inner surface of the parts to be welded, in combination with an outer tire arranged to bear against the outer surface of the parts to be welded and afford support thereto against the expanding force of the inner dies, and suitable mechanism for imparting to such inner dies an outward motion for the purpose of making the weld, and an inward motion alternating therewith, substantially as described.

2. In a machine for welding heads in cylinders, the combination of table C, band or tire F, secured to the table with provision for lateral movement of the band on the table, as described, and two or more inner dies, E', arranged to move outward from a common center in opposite directions and press the parts to be welded against the inclosing-band, substantially as set forth.

3. The combination of stationary table C, bars E, arranged to slide radially on the table, dies E', secured on the inner ends of the bars, such dies having their outer edges or working-faces formed in the same circle as the inner surface of the parts to be welded, inclosing-tire F, arranged to act against the outer surface of the cylinder, as described, pivoted levers K, rollers $H^2$, arranged to rotate around the table, and by bearing against the outer ends of the bars and levers to operate the dies, as described, and means for increasing and diminishing the extent of motion imparted to the dies by the rollers, substantially as and for the purposes set forth.

In testimony whereof I have hereunto set my hand.

ROBERT A. CARTER.

Witnesses:
R. H. WHITTLESEY,
C. L. PARKER.